March 28, 1961 A. DUERKSEN 2,977,092
MOBILE TIRE SPREADER
Filed May 31, 1957 6 Sheets-Sheet 3

INVENTOR.
Arnold Duerksen
BY
ATTYS

March 28, 1961     A. DUERKSEN     2,977,092
MOBILE TIRE SPREADER
Filed May 31, 1957            6 Sheets-Sheet 4
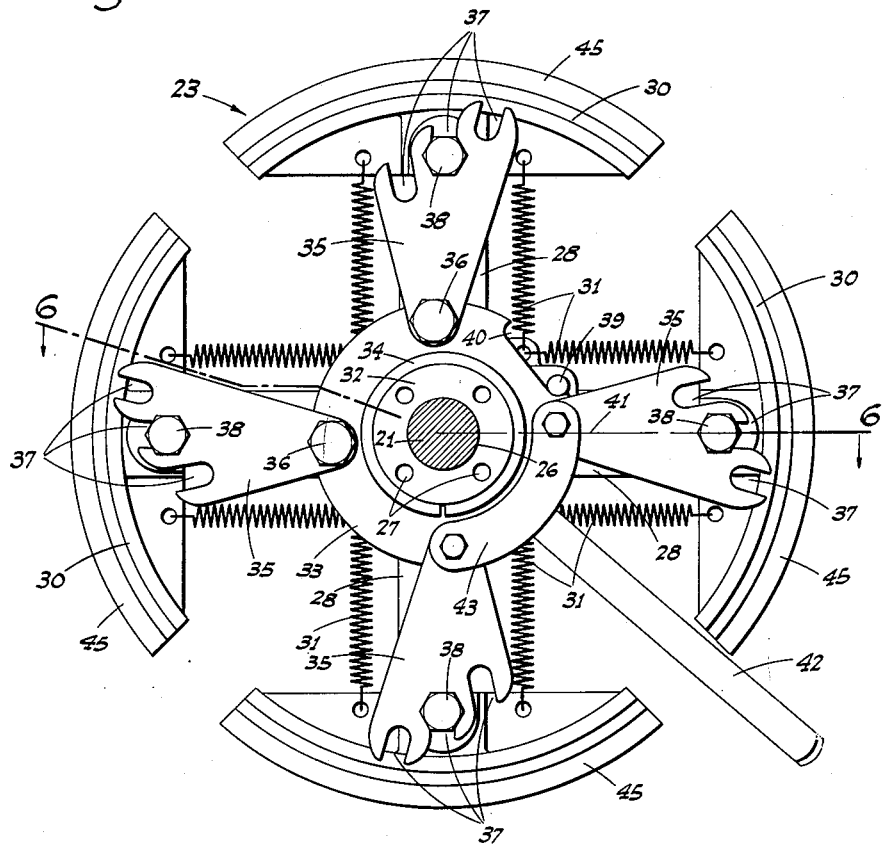
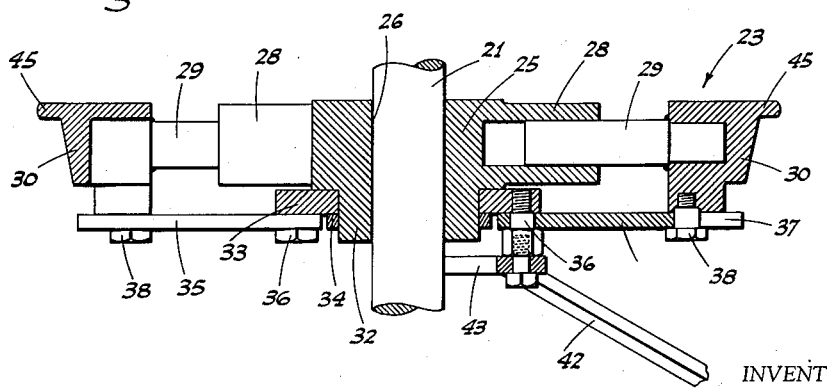
INVENTOR.
Arnold Duerksen
BY
ATTYS March 28, 1961     A. DUERKSEN     2,977,092
MOBILE TIRE SPREADER Filed May 31, 1957     6 Sheets-Sheet 5

INVENTOR.
Arnold Duerksen
BY
ATTYS

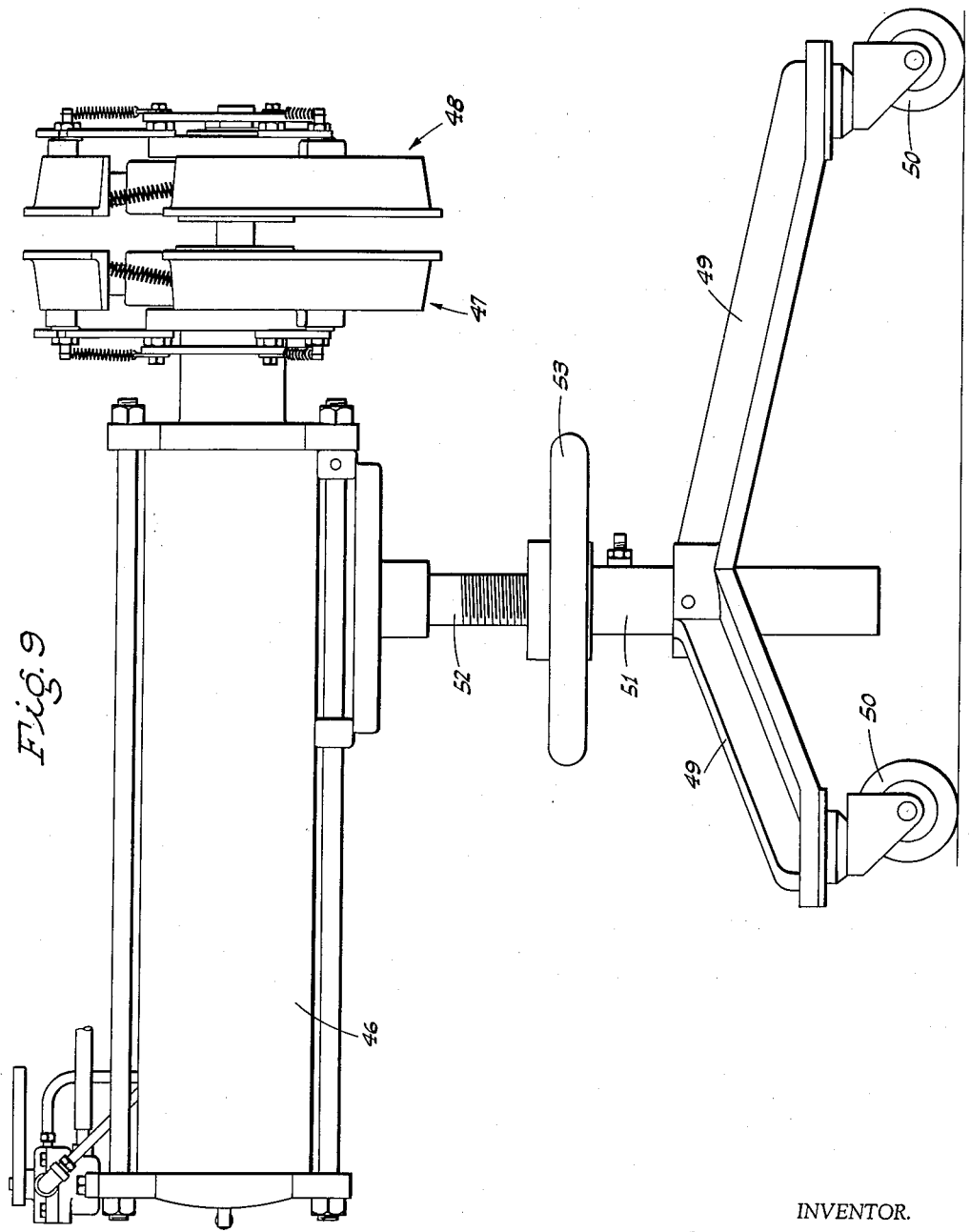

2,977,092
United States Patent Office
Patented Mar. 28, 1961

2,977,092
MOBILE TIRE SPREADER

Arnold Duerksen, Lodi, Calif., assignor to Super Mold Corporation of California, Lodi, Calif., a corporation of California Filed May 31, 1957, Ser. No. 662,629

5 Claims. (Cl. 254—50.3)

The present invention relates to, and it is an object to provide, a novel tire spreader which is operative to engage the beads of a tire from the inside and relatively widely separate such beads, whereby to substantially reduce the outside diameter of the tire, and which remains peripherally unobstructed; the tire then being capable of ready insertion into, or removal from, an endless or band-type retreading mold.

Endless or band-type tire retreading molds are commonly supported in an upstanding, laterally opening position, and it is another important object of this invention to provide a tire spreader which likewise but independently supports the tire; the spreader being shiftable along the floor to accomplish movement of the reduced-diameter tire into or out of the mold.

An additional object of the invention is to provide a tire spreader, as above, in which the tire-engaging structure thereof is variable in elevation, whereby to properly position the tire relative to the mold; the spreader—in one embodiment—being operative to engage a tire standing on the floor, and to then elevate the tire to such position, and in which the tire and mold are in axial alinement.

A further object of the invention is to provide a tire spreader which includes opposed, initially adjacent but axially separable tire bead engaging chuck units of novel construction and function; such chuck units being adjustable to pre-set the contracted diameter thereof necessary for entry into a tire of given size, and then radially expansible for engagement with the corresponding tire beads from the inside upon axial separation of said chuck units.

It is also an object of the invention to provide a practical, reliable, and durable tire spreader, and one which will be exceedingly effective for the purpose for which it is designed.

These objects are accomplished by means of such structure and relative arrangements of parts as will fully appear by a perusal of the following specification and claims.

In the drawings:

Fig. 5 is a view similar to Fig. 3, but shows the chuck unit as expanded.

Fig. 6 is a sectional plan view taken on line 6—6 of Fig. 5.

Fig. 9 is a side elevation showing a modified embodiment of the tire spreader.

Figure 1:
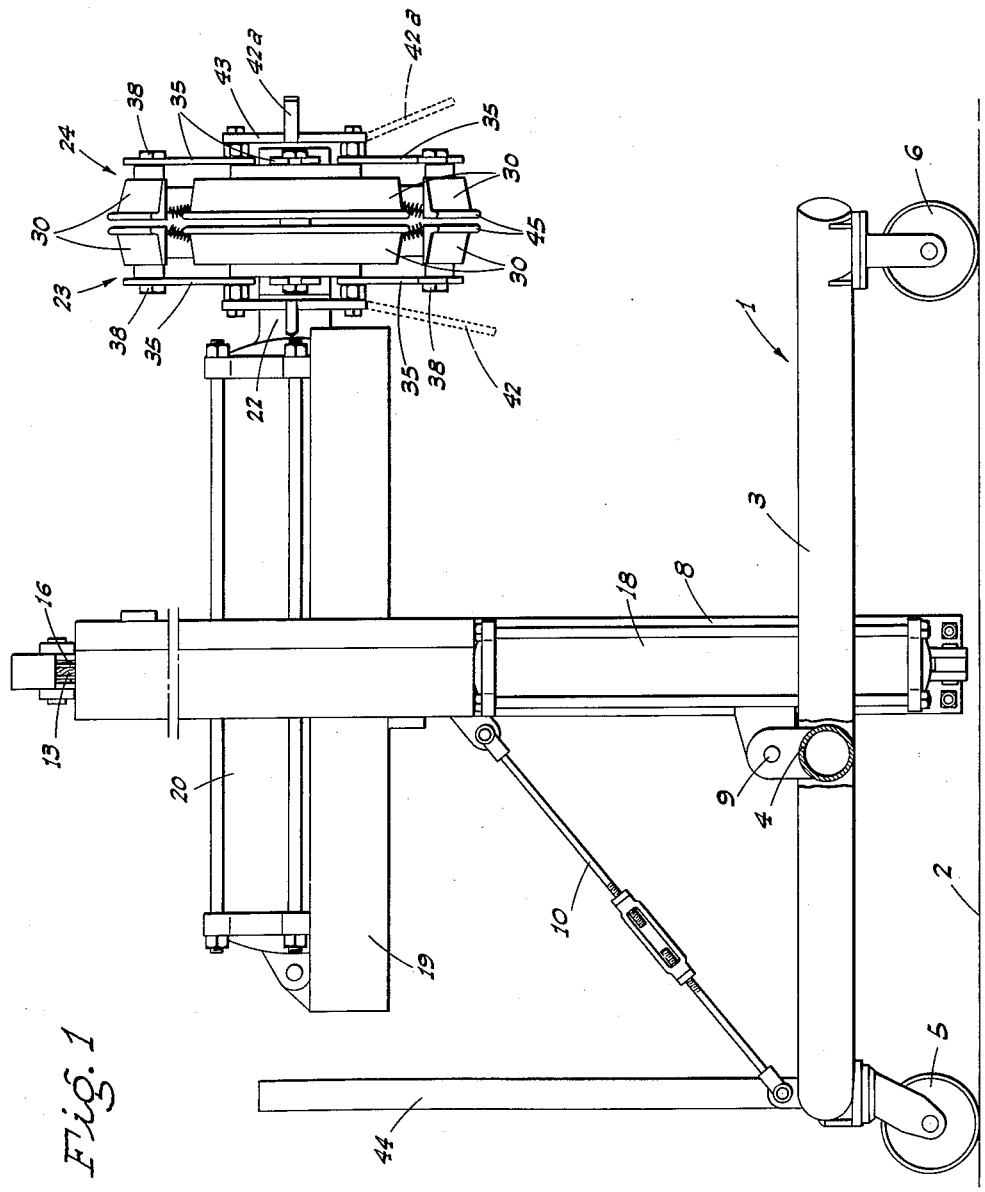
Fig. 1 is a side elevation of the tire spreader.
Figure 2:
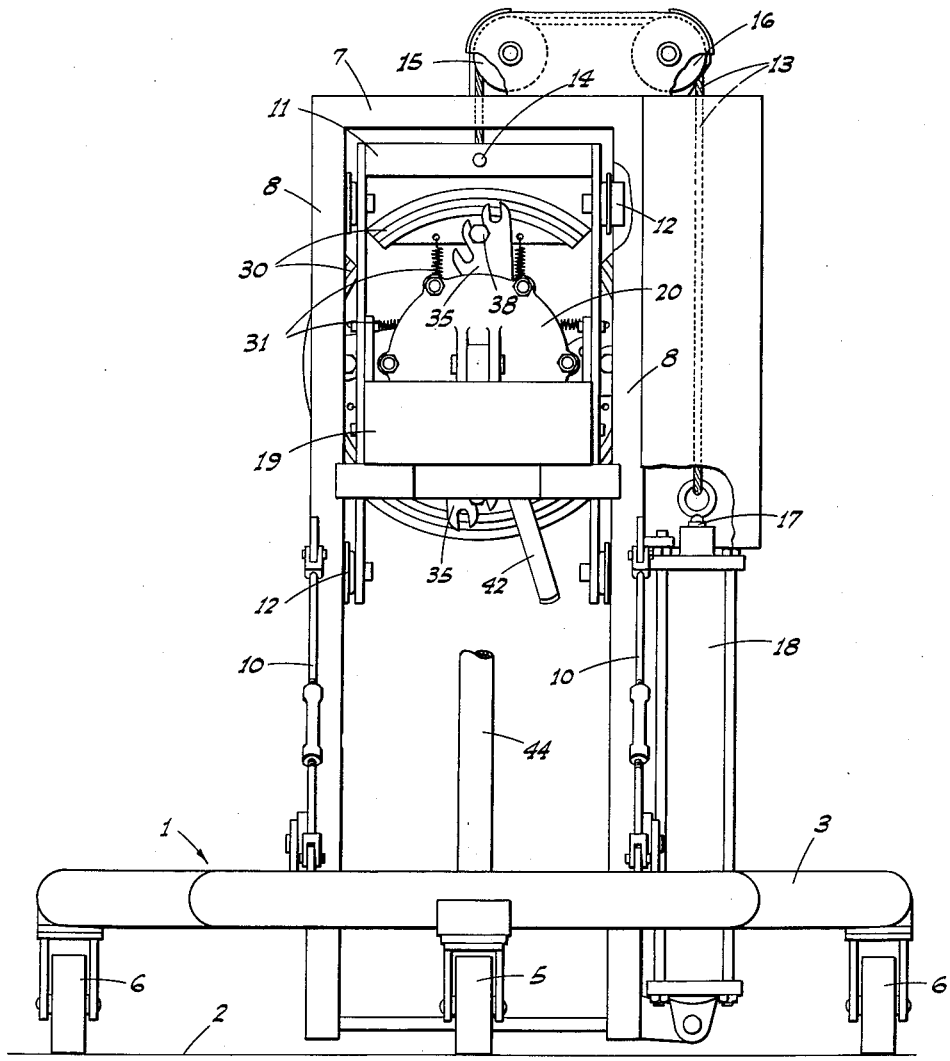
Fig. 2 is a rear end elevation, partly broken away, of the tire spreader.

Referring now more particularly to the drawings and to the characters of reference marked thereon, and at present to Figs. 1-8 inclusive, the tire spreader comprises a horizontal main frame, indicated at 1; such main frame being disposed horizontally adjacent but above the floor 2. The main frame 1, which is open at its forward end, includes side beams 3; such side beams being rigidly connected—intermediate their ends—by a cross beam 4.

A rear caster wheel 5 supports the main frame 1 centrally of its sides, while front caster wheels 6 support the free ends of the corresponding side beams 3.

Between the side beams 3 and directly ahead of the cross beam 4 there is an upstanding, inverted, U-shaped elevator frame 7 which includes side posts 8 which terminate at their lower ends adjacent but short of the floor 2. The elevator frame 7 is pivotally connected, as at 9, to the cross beam 4, and adjustable-length, diagonal stays 10 are connected between the side posts 8 and the rear of the main frame 1; said stays 10 being adjustable—in effective length—for the purpose of setting the upstanding position of said elevator frame 7.

An elevator carriage 11 is movable up and down in the elevator frame 7, and such carriage 11 includes—on opposite sides—vertically spaced rollers 12 which run in the posts 8; the latter being of inwardly opening channel form.

A cable 13 is centrally connected to the top of the elevator carriage 11, as at 14, and thence extends upwardly and turns about direction-changing sheaves 15 and 16 mounted in transversely spaced relation on top of the elevator frame 7.

From the sheaves 16 the cable 13 extends downwardly to connection with the free end of an upwardly projecting piston rod 17 of a vertically disposed, double-acting power cylinder 18 mounted in connection with the adjacent side post 8. The power cylinder 18—which is controlled by a suitable valve-regulated, fluid pressure conduit system (not shown)—is thus operative to selectively raise or lower the elevator carriage 11 in the elevator frame 7.

At the bottom, and between the sides thereof, the elevator carriage 11 is fitted with a horizontal bed 19 which projects both forwardly and rearwardly from said carriage; such bed supporting a substantially horizontal power cylinder 20 which includes a forwardly extending piston rod 21 which runs out of a front end neck 22 of said cylinder 20. The power cylinder 20 is of double-acting type and is controlled through the medium of a valve regulated, fluid pressure conduit system (not shown).

Ahead of the power cylinder 20 the spreader includes a pair of tire bead engaging chuck units, indicated generally at 23 and 24. Such chuck units 23 and 24 are axially alined with each other and with the power cylinder 20; the chuck unit 23 being fixed in connection with the cylinder neck 22, while the chuck unit 24 is fixed on the outer end portion of the piston rod 21.

As the chuck units 23 and 24 are of substantially identical construction, except that they are opposed, a description of the unit 23 will suffice for both.

The chuck unit 23—which is shown in detail in Figs. 3-6 inclusive—comprises a hub 25 having a bore 26 through which the piston rod 21 is slidable; such hub being formed, about the bore 26, with bolt holes 27 adapted to receive bolts which secure such hub 25 in end abutment with the neck 22 of power cylinder 20. In this manner the hub 25 and consequently the entire chuck unit 23—as hereinafter described in detail—are effectively supported from said power cylinder 20.

The hub 25 is formed with a plurality (here four) of equally circumferentially spaced, radial guide sleeves or sockets 28 in which radially outwardly projecting bars or spokes 29 are slidably received.

Each radial bar 29 is fitted—at its outer end, and in symmetrical relation—with a tire bead engaging chuck jaw in the form of a ring segment 30; such jaws or segments being circumferentially alined in order to provide—in effect—a ring, yet the end spacing is sufficient to allow such segments to move in and out with radial sliding of the bars or spokes 29 in the guide sleeves or sockets 28.

Pull-back springs 31, disposed on opposite sides of and parallel to each radial bar 29, are connected between the related ring segment 30 and the hub 25; the extent to which said springs 31 can pull the ring segments radially inwardly, and which predetermines the contracted diameter of the chuck unit, being controlled as follows:

At the rear end thereof the hub 25 is formed with a reduced-diameter neck 32 about which a control ring 33 is turnable; such ring being held in place by an annular retainer 34.

A flat, stand-off arm 35 extends from the control ring 33 toward each ring segment 30; such stand-off arms 35 being pivoted at their inner ends, as at 36, to the face of the control ring 33 adjacent its periphery. The stand-off arms 35 are equally spaced about the control ring 33, and at the outer end each such stand-off arm is formed with a row of notches 37, and which row extends in eccentric relation to the corresponding pivot 36.

Figure 3:
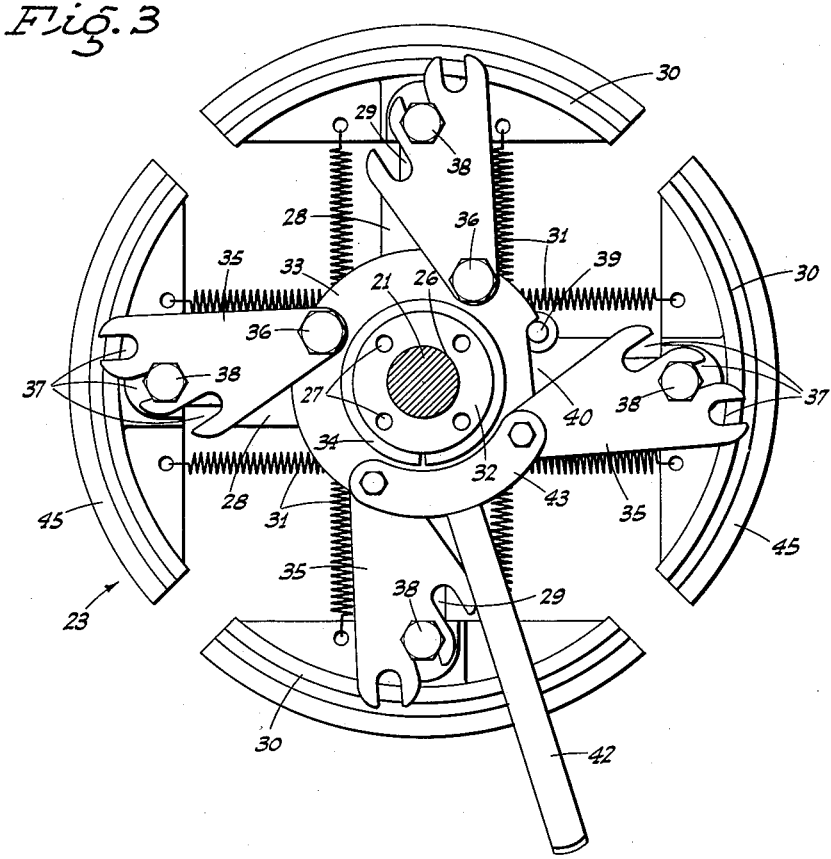
Fig. 3 is a rear end elevation of the inner chuck unit as adjusted to a selected contracted diameter.
Figure 4:
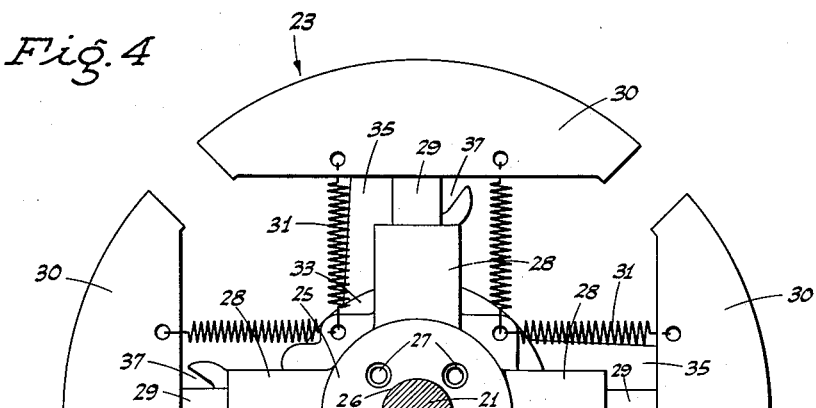
Fig. 4 is a fragmentary front end elevation of the chuck unit shown in Fig. 3.

Each ring segment 30 is provided, centrally of its ends, with a headed, outwardly projecting stud 38 which is adapted to engage in a selected one of the notches 37 in the corresponding stand-off arm 35. By pulling outwardly on the ring segments 30, against the tension of springs 31, the studs 38 can be engaged in selected and corresponding ones of the notches 37, which will preset the chuck unit to the desired contracted diameter. At such time, the control ring is disposed so that the pivots 36 are a substantial distance beyond dead-center—in one direction—relative to the radial center lines of the corresponding bars 29. In this position of the control ring a stop pin 39, fixed to hub 25, abuts one end of an elongated tangential notch 40 in said control ring, as shown in Fig. 3.

When it is desired to expand the chuck unit from its pre-set contracted diameter, the control ring 30 is rotated until the stop pin 39 abuts the other end of notch 40 and the pivots 36 pass slightly beyond dead-center—in the opposite direction—relative to said radial center lines of the corresponding bars 29, as in Fig. 5, and wherein one of said radial center lines is indicated at 41.

This results in outward thrusting—simultaneously—of the stand-off arms 35 and corresponding expansion of the chuck unit. Part-rotation of the control ring 33 in a direction to so thrust the stand-off arms 35 outwardly to expand the chuck unit, or in the reverse direction to return the chuck unit to its pre-set contracted diameter, is accomplished by means of a radial lever 42 secured at its inner end—by means of a spanner plate 43—to adjacent ones of the bolts which comprise the pivots 36. The radial lever 42a of the chuck unit 24 is somewhat shorter than the lever 42 of the chuck unit 23; this for the purpose as will hereinafter appear.

Figure 7:
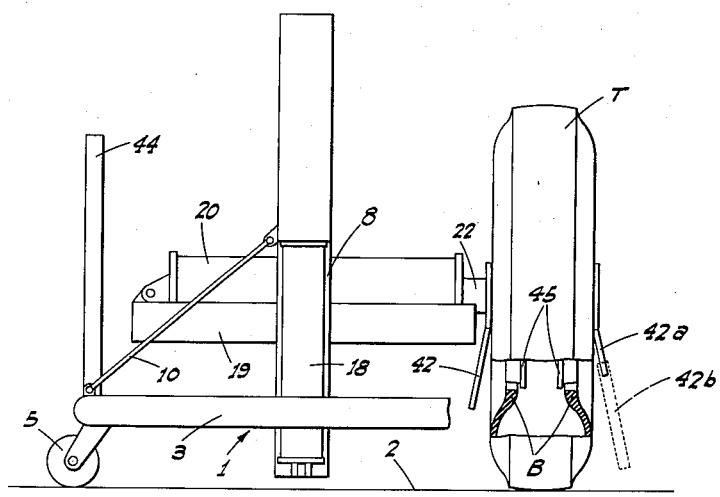
Fig. 7 is a diagrammatic view of the tire spreader in lowered position, and with the chuck units disposed in an upstanding, floor-supported tire, but before radial expansion and axial separation of said units.
Figure 8:
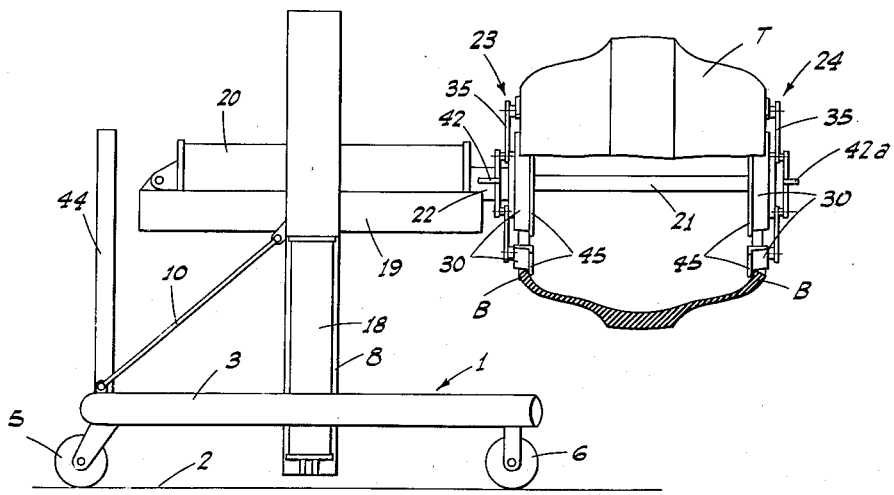
Fig. 8 is a similar view, but shows the spreader in raised position and with the chuck units radially expanded and axially separated so as to spread the beads and reduce the diameter of the tire.

In use of the above described tire spreader the chuck units 23 and 24 are initially pre-set to a predetermined contracted diameter, and are disposed in adjacent relation, as shown in Fig. 1. Thereafter, the assembly of such chuck units is lowered, by the elevator carriage 11, to a point or level at which said chuck units can be introduced—upon manipulation of the caster wheel supported main frame 1—into a tire T standing on the floor, and as shown in Fig. 7. The main frame 1 is readily manipulated by means of a post 44 which upstands from said frame centrally at the rear.

After introduction of the contracted chuck units 23 and 24 into the upstanding floor-supported tire T, said chuck units are then expanded by manipulation of the radial levers 42 and 42a.

The lever 42a is relatively short, as shown, so that it does not interfere with entry of the chuck units into the tire, but thereafter an extension 42b is removably applied to said lever 42a in order to aid in the operation of the latter.

Upon expansion of the chuck units 23 and 24 they bear against corresponding beads B of the tire; the ring segments 30 including radially outwardly projecting flanges 45 which then engage said tire beads B from the inside.

The power cylinder 20 is then actuated to cause radial separation of the chuck units 23 and 24, which relatively widely separates the beads B of the tire, and effectively reduces the outside diameter thereof. See Fig. 8.

With the tire beads thus spread, and the tire reduced in diameter, the carriage 11 is elevated so as to dispose the chuck units and bead expanded tire thereon at proper horizontal level for entry into an upstanding endless or band-type mold (not shown), and which entry is accomplished by manipulation of the wheel-supported main frame 1 on the floor 2.

After the tire is placed in the band-type mold, the chuck units 23 and 24 are again returned to closely adjacent relation by reverse operation of the power cylinder 20, and then said chuck units are re-set to the contracted diameter and withdrawn from the tire; the latter remaining in the mold for vulcanization of the new tread thereon. Before withdrawal of the chuck units from the tire the lever extension 42b is removed.

When the vulcanizing operation is completed, the tire—as retreaded—is removed from the band-type mold by the above described steps, but in reverse sequence.

By reason of the novel arrangement of the stand-off arms 35 the chuck units 23 and 24 can be pre-set to different contracted diameters, as necessary for entry into tires of different sizes, but in any such pre-set position said chuck units can be expanded to substantially the same extent by the simple expedient of manipulating the levers 42 and 42a; all so that the tire spreader is not limited in use to one tire size.

In the embodiment illustrated in Fig. 9, the assembly of the power cylinder 46 and chuck units 47 and 48 remains substantially as shown in Figs. 1–8. Here, however, the supporting structure for the power cylinder 46 is modified and comprises the following:

A spider leg base 49 carried on floor-engaging caster wheels 50 is fitted with a tubular mounting post 51 into which a vertical spindle 52 extends; there being a hand wheel 53 threaded on such spindle 52 and bearing against the upper end of the post 51 for the purpose of adjusting the assembly of power cylinder 46 and chuck units 47 and 48 up or down to match the mold. Such assembly of the power cylinder 46 and chuck units 47 and 48 functions in the same manner as hereinbefore described, except that it is not mounted for power elevating, nor adapted to initially enter and lift up a relatively heavy tire—such as a truck tire—from the floor. The embodiment of Fig. 9 is particularly adapted for those tires which are relatively light weight—such as an automobile tire—and which an operator can readily manually lift and place on the chuck units 47 and 48.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A tire spreader comprising a support, a pair of axially alined initially adjacent radially adjustable chuck units, means mounting the chuck units in connection with the support for relative axial movement from an adjacent position to a separated position, the chuck units being initially contracted and exposed for entry into a tire, and means on the chuck units adapted to engage the tire beads from the inside upon expansion of said chuck units and relative axial separating movement thereof; each such chuck unit including a hub, circumferentially spaced spokes radiating in slidable relation from the hub, a chuck jaw on the outer end of each spoke, said chuck jaws being spaced in circumferential alinement, pullback springs connected between the hub and chuck jaws yieldably urging the same inwardly, a control ring turnable on the hub clear of the spokes, a pivoted stand-off element connected between each chuck jaw and the control ring, and means to part-circle rotate the control ring in one direction or the other to cause said elements to thrust the chuck jaws outwardly to expand the chuck unit or to permit inward movement of the chuck jaws to contract the chuck unit, respectively.

2. A tire spreader, as in claim 1, in which said stand-off elements each comprise an arm pivoted at the inner end to the control ring, a row of outwardly opening notches in the outer end of the arm, said row being eccentric to the arm pivot, and a stud on the related chuck jaw adapted to engage, selectively, in one of said notches to pre-set the contracted diameter of the chuck unit.

3. A tire spreader comprising a support, a pair of axially alined initially adjacent radially adjustable chuck units, means mounting the chuck units in connection with the support for relative axial movement from an adjacent position to a separated position, the chuck units being initially contracted and exposed for entry into a tire, and means on the chuck units adapted to engage the tire beads from the inside upon expansion of said chuck units and relative axial separating movement thereof; each such chuck unit including a hub, circumferentially spaced spokes radiating in slidable relation from the hub, a chuck jaw on the outer end of each spoke, said chuck jaws being spaced in circumferential alinement, pull-back springs connected between the hub and chuck jaws yieldably urging the latter inwardly, a control ring turnable on the hub clear of the spokes, a stand-off arm corresponding to each spoke pivoted at the inner end to the control ring, a row of outwardly opening notches in the outer end of the stand-off arm, said row being eccentric to the arm pivot, a stud on the related chuck jaw adapted to engage, selectively, in one of said notches to pre-set the contracted diameter of the chuck unit, means to part-circle rotate the control ring between one position with the stand-off arm a distance in one direction beyond dead-center relative to the radial center line of the related spoke and another position with said arm a lesser distance in the other direction beyond dead-center, and means to limit movement of the control ring to such part-circle rotation.

4. A tire spreader, as in claim 1, in which said control ring rotating means comprises a lever secured in connection with said control ring and radiating therefrom clear of the spokes and chuck jaws.

5. A tire spreader comprising a support, a pair of axially alined initially adjacent radially adjustable chuck units, means mounting the chuck units in connection with the support for relative axial movement from an adjacent position to a separated position, the chuck units being initially contracted and exposed for entry into a tire, and means on the chuck units adapted to engage the tire beads from the inside upon expansion of said chuck units and relative axial separating movement thereof; each such chuck unit including a hub, circumferentially spaced spokes radiating in slidable relation from the hub, a chuck jaw on the outer end of each spoke, said chuck jaws being spaced in circumferential alinement, a control ring turnable on the hub clear of the spokes, means responsive to part-circle rotation of the control ring in one direction or the other to move the chuck jaws outwardly and inwardly whereby to expand and contract, respectively, the chuck unit, said chuck jaw moving means including a pivoted standoff element connected between each chuck jaw and the control ring, and means to part-circle rotate the control ring in said one direction or the other.

References Cited in the file of this patent

UNITED STATES PATENTS

| | | |
|---|---|---|
| 1,705,145 | Thrift | Mar. 12, 1929 |
| 1,781,104 | De Lamar | Nov. 11, 1930 |
| 1,878,515 | Hazard | Sept. 20, 1932 |
| 2,332,576 | Iversen et al. | Oct. 26, 1943 |
| 2,353,570 | Kraft | July 11, 1944 |
| 2,655,977 | Hodgkins | Oct. 20, 1953 |
| 2,712,156 | Potter et al. | July 5, 1955 |
| 2,850,263 | Hawkinson | Sept. 2, 1958 |
| 2,905,436 | Hawkinson | Sept. 22, 1959 |

FOREIGN PATENTS

| | | |
|---|---|---|
| 1,005,281 | France | Dec. 19, 1951 |